April 3, 1951
E. D. KLEMA
2,547,874
HYDROGEN PURIFICATION METHOD
Filed May 24, 1948
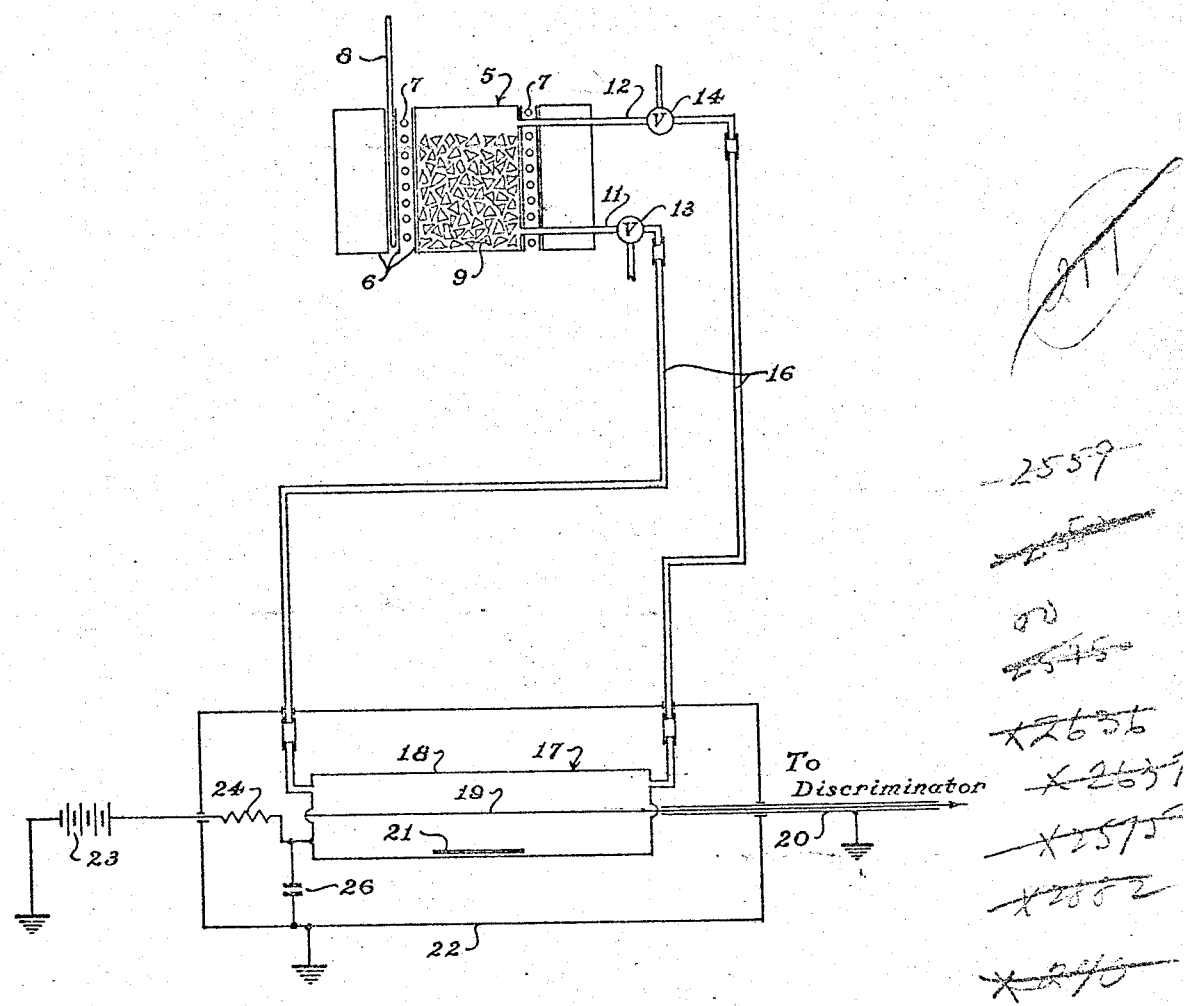
WITNESSES
INVENTOR.
Ernest D. Klema
BY
Roland A. Anderson
Attorney Patented Apr. 3, 1951

2,547,874

UNITED STATES PATENT OFFICE 2,547,874

HYDROGEN PURIFICATION METHOD

Ernest D. Klema, Salina, Kans., assignor to the United States of America, as represented by the United States Atomic Energy Commission Application May 24, 1948, Serial No. 28,798

3 Claims. (Cl. 23—210)

This invention relates to methods and means for furnishing a continuous and constant source of purified hydrogen or of mixtures of hydrogen and inert gases.

Pure hydrogen or a mixture of pure hydrogen and inert gases is desirable for use in certain scientific apparatus and instruments. For example, such gases are particularly important in ionization chambers and counters used for the investigation of nuclear radiation and the like. For such uses it is desirable that these gases be free of all impurities which capture electrons, such as oxygen, water vapor, or the halogen gases. Hydrogen and inert gases such as argon, however, usually contain oxygen and water vapor in very small amounts. The small amounts of oxygen or water vapor originally present or picked up from the containers are harmless for most uses but they reduce the value of the gas or gases when it is necessary that the gases be substantially free of electron capturing impurities. Impurities such as oxygen or water vapor are also undesirable for use in scientific instruments such as ionization chambers, because in addition to capturing electrons, they also change the collection time, reduce the pulse height, increase the saturation voltage, and in some cases cause deterioration of the instrument.

In the past the hydrogen or hydrogen rare gas mixtures have been purified by the method described by H. H. Barschall and E. D. Klema on page 18 of 63d Volume of the Physical Review (1943). This method consists of passing the material to be purified over platinized asbestos and a desiccating agent. Although somewhat effective this method is not convenient to use and is not completely satisfactory.

The object of this invention is to furnish an apparatus and a method for efficiently and conveniently purifying hydrogen or mixtures of hydrogen and inert gases.

A further object of this invention is to furnish an apparatus and a method for continuously and efficiently preparing pure hydrogen or mixtures of hydrogen and inert gases free of water, oxygen, and halogens.

Still further objects and advantages of this invention will be apparent from the following description and from the single figure which shows a schematic arrangement of a purifier used to furnish purified gas to an ionization chamber in accordance with the method of this invention.

The objects of this invention are achieved by the process which comprises passing the hydrogen or mixture of hydrogen and inert gases over a hydride of a light metal of the third period of the class consisting of calcium and titanium.

The apparatus for accomplishing the objects comprises purifying material, means for holding the purifying material, means for heating and purifying material, means for utilizing the purified gas, and connecting means between said purifying and said utilizing means which permits circulation of the gas.

More particularly the process comprises circulating the gas in series through the utilizing means and then over one or more heated hydrides of third period light metals, particularly calcium hydride and titanium hydride, and then back to the utilizing means.

The calcium hydride or titanium hydride is especially effective in removing oxygen, water vapor, halides, or hydrohalides. Typical reactions thought to be involved are as follows:

$$CaH_2 + H_2O \rightarrow CaO + 2H_2\uparrow$$
$$2CaH_2 + O_2 \rightarrow 2CaO + 2H_2\uparrow$$

The method and apparatus of this invention can best be illustrated by an embodiment which is presented in the single figure hereby made part of this specification. It is given for the purpose of illustration only and is not intended to be limiting on the spirit or scope of the invention.

Example I

A cylindrical steel purifier generically indicated by reference numeral 5 about 3.5 centimeters in diameter and 10.0 centimeters long is insulated with a layer of asbestos tape 6. The insulated purifier 5 is placed in a heating coil 7. The coil is covered with a layer of asbestos tape, a mercury in glass thermometer 8 is inserted, and additional layers of tape are placed around the coil. The purifier 5 is quickly filled with the purifying material 9 which is calcium hydride ground to pass a 4 mesh screen and to be held on an 8 mesh screen. The filling must be done as rapidly as possible because the calcium hydride oxidizes extremely rapidly in air, a chunk becoming oxide powder in about thirty minutes. The inlet connection 11 and outlet connection 12 are 1/8 inch steel pipes centered respectively about 1.5 centimeters from the bottom and top of the purifier 5. A three-way inlet valve 13, and a three-way outlet valve 14 are connected respectively in the inlet connection 11 and outlet connection 12. The inlet and outlet connections 11 and 12 are connected to glass tubing 16 by joints which are not shown. The ionization chamber generically indicated by 17 in which the purified hydrogen and inert gas or gases are to be used is connected in series with the purifier 5 by means of glass tubing 16 and two joints which are not shown. The chamber 17 is a 3-inch hermetically sealed metallic cylinder 18 containing a 25 mil diameter center wire 19. The center wire 19 is anchored at one end by an electrically non-conducting gas tight seal and at the other end by a similar seal through which it enters a coaxial cable 20 and thus through the grounded shield 22 to a discriminator, such as the Schmitt's-trigger variety which is not shown. The metallic cylinder 18 is connected to the positive terminal of a high voltage direct current supply 23 whose negative side is grounded. A high resistance 24 is placed between the cylinder 18 and the high voltage supply 23, and a condenser 26 is placed between the cylinder 18 and the shield 22 in order to filter the high voltage supply. A thin foil of radio-active material 21, which emits about 5000 alpha particles per minute, is placed within the cylinder 18, against its outer wall.

In order to operate the apparatus, argon or nitrogen is first admitted into the purifier 5 by means of the inlet valve 13, and is allowed to exhaust through the outlet valve 14 until all the dust is removed from the purifying material 9. The heating coil 7 is then turned on, the system is evacuated by means of gas outlet valve 14 and the purifier 5 is outgassed at about 250° C. Three atmospheres of 99.6 per cent argon and one atmosphere of substantially pure hydrogen are then introduced by means of the inlet valve 13 into the system. The temperature of the purifier 5 is maintained at 250° C. The temperature differential between purifier 5 and chamber 17 causes the gas to circulate between them.

Potential of 540 volts is applied across the chamber and the bias curve is determined. Bias curves are determined when potentials of 1025, 2260, and 2975 volts are successively applied across the chamber. Coinciding bias curves are obtained when 2260 and 2975 volts are applied, indicating that saturation is attained above 1025 volts but below 2260 volts.

The calcium hydride used as a purifying material in this example will supply gas, free of impurities for a long period of time. For instance, when the apparatus described in Example I is operated continuously for a three-day period, the bias curve determinations at the end of this period are identical with those originally obtained under the same conditions. When the gas is not purified the response is not constant with time, and the saturation voltage and pulse height decreases due to the changing purity of the gas mixture.

It is often desirable that a much smaller amount of hydrogen be used in ionization chambers than the 25 per cent by volume of hydrogen used in Example I. Example II presents the preferred embodiment for such cases in which the only hydrogen present is introduced by the hydride used.

*Example II*

The purifier 5 as used in Example I is filled with a mixture containing calcium hydride and a small amount of calcium which have both been ground until they will pass a 4 mesh and be held on an 8 mesh screen. The system is assembled, evacuated, and 35 pounds pressure of argon is then admitted. The purifier is allowed to stand overnight at 360° C. It is then operated at this temperature, but the bias curves do not show a maximum pulse height: instead the plot of counts versus discriminator bias is a practically straight horizontal line indicating that multiplication is occurring in the ionization chamber. The temperature is then raised in 20° C. increments and the bias curves are determined. When the temperature reaches 480° C. the bias curves remain unchanged with time showing that multiplication is no longer occurring and that the purity of the gas is remaining constant.

The temperature is held in the range of 480° C. to 525° C. and the bias curve is determined for potentials of 1025, 2260, and 2975 volts. All three bias curves are nearly identical, thus indicating that saturation is obtained at or below 1025 volts.

Embodiments such as the one presented in Example II have the advantage that reproducible, but very small amounts of hydrogen may be introduced and purified. It may be noted that in Example II, where only a small amount of hydrogen was present, saturation was obtained at a much lower potential than in the case of Example I where 25 per cent hydrogen was present. The amount of hydrogen present may be increased by increasing the temperature of the calcium hydride. It is interesting to note that although the amount of hydrogen used in the ionization chamber 17 may be reduced to a very small amount, it cannot be completely eliminated because in its absence it is difficult or impossible to obtain saturation of the chamber 17. Apparently when the field strength near the wall of the cylinder 18 is still too low to saturate the alpha-particle ionization, the field strength near the wire 19 is already high enough to cause multiplication.

Other hydrides such as titanium hydride may be used as the purifying agent. This is illustrated in Example III where the purified mixture of gas is used in an ionization chamber similar to the one used in Examples I and II.

*Example III*

The purifier 5 is filled with titanium hydride. The system is evacuated and outgassed at 250° C. One atmosphere of hydrogen and 3 atmospheres of 99.6 per cent argon are admitted. The temperature is adjusted to 250° C. Using this system, saturation is obtained at about 1000 volts potential applied across the chamber. This saturation voltage and the pulse height remain constant when the system is operated continuously for three days indicating that the gas remains pure.

Titanium hydride has a higher dissociation pressure at a given temperature than does calcium hydride; therefore, in comparison to calcium hydride, titanium hydride will have the same pressure of hydrogen over it at a lower temperature, or a higher hydrogen pressure at the same temperature.

As in the case of calcium hydride, it is possible to use titanium hydride to purify substantially pure hydrogen or varying compositions of hydrogen and inert gases.

It is to be understood that although the examples described the purification of hydrogen and argon used in an ionization chamber, the same method and apparatus may be used for purifying hydrogen or a mixture of hydrogen and inert gases in any place where such a gas or mixture of gases are needed. The method and apparatus will remove any oxygen, water vapor, halides or hydrohalides which are present. As pointed out hereinbefore, in any such embodiment the composition may vary from substantially pure hydrogen containing no inert gas to a composition containing one or more inert gases and a very small amount of hydrogen.

It is to be noted that other inert gas or gases, such as helium or neon, may be used in the place of or with the argon used in the examples.

An apparatus such as that described hereinbefore may be modified by the addition of a neutron sensitive foil so that it may be used for the detection or measurement of the properties of neutrons. For example, uranium 235 may be conveniently used as a neutron sensitive foil.

There are of course many variations of this invention. For example, the rate of circulation of the gas may be increased by introducing a circulating pump. Baffles may be inserted in the outlet of the purifier to prevent any dust from being circulated. The size and shape of the various parts of the apparatus may of course be varied. The purifying materials need not be ground to pass a 4 mesh screen and be held on an 8 mesh screen, but may be of any size which presents sufficient surface area to carry out the purification of the gas in an efficient manner.

Because of the many possible variations, it is to be understood that this invention is not to be limited in spirit or scope except as indicated in the appended claims.

What is claimed is:

1. A method of continuously removing oxygen, water vapor, hydrohalides and halogens from a gas containing hydrogen which comprises passing the gas over a hydride of a third period light metal of the class consisting of calcium and titanium heated to a temperature of at least 250° C.

2. A method for purifying gases containing hydrogen which comprises passing the gas over calcium hydride which is maintained at a temperature of about 500° C.

3. A method for purifying gases containing hydrogen which comprises passing the gas over titanium hydride which is maintained at a temperature of about 250° C.

ERNEST D. KLEMA.

REFERENCES CITED

The following references are of record in the file of this patent:

UNITED STATES PATENTS

| Number | Name | Date |
| --- | --- | --- |
| 1,681,702 | Jost | Aug. 21, 1928 |
| 1,955,328 | Frey | Apr. 17, 1934 |
| 2,041,663 | Marx | May 19, 1936 |
| 2,399,450 | Ramseyer | Apr. 30, 1946 |

FOREIGN PATENTS

| Number | Country | Date |
| --- | --- | --- |
| 25,215 of 1907 | Great Britain | July 2, 1908 |